March 3, 1964

H. C. ZEISLOFT 3,123,128

FUEL METERING SYSTEM

Filed April 20, 1961

INVENTOR.
Harry C. Zeisloft
BY
Paul Fitzpatrick
ATTORNEY

United States Patent Office 3,123,128
Patented Mar. 3, 1964

3,123,128
FUEL METERING SYSTEM
Harry C. Zeisloft, Brookfield, Wis., assignor to General Motors Corporation, Detroit, Mich., a corporation of Delaware
Filed Apr. 20, 1961, Ser. No. 104,386
12 Claims. (Cl. 158—36.4)

My invention is directed to improvements in systems for supplying a liquid at a controlled rate, particularly to systems for metering fuel to combustion engines, including gas turbines. It is usual practice to control the supply of fuel to gas turbine engines by pumping the fuel through a variable area metering valve while maintaining a constant pressure drop across the valve. The constant pressure drop usually is maintained by a head regulating valve which, in many cases, acts by controlling bypass of fuel from a pump outlet to the inlet of the pump. In systems with impositive pumps, the head regulating valve may be a throttling valve in series with the metering valve.

In general, whatever the arrangement of the system, it is customary to meter fuel at high pressure, the value of this pressure depending upon the nature of the engine, but sometimes reaching values as high as 1,000 p.s.i. High pressure levels require heavier housings and larger and stronger components, which cause deflection problems and sealing difficulties. Another serious difficulty, where small engines with corresponding small rates of fuel supply are concerned, lies in providing sufficiently small metering ports with the desired accuracy. In a conventional system, valve leakage becomes an increasingly difficult problem to control as the metering area decreases.

The two principal objects of my invention are to meter the flow in a high-pressure fuel system with metering elements which are operative in the low pressure part of the system, and to provide precise metering at very low flows. My metering system utilizes a differential principle in which the flow of fuel to the engine is the difference between flow to the pump through one set of metering ports and a bypass or return flow from the pump through a second set of metering ports which are varied coordinately with the first set, thus making it possible to achieve high-flow accuracy at very low flow rates.

The nature of the invention and the advantages thereof will be apparent to those skilled in the art from the succeeding description of the embodiment in a simple fuel control system for a gas turbine jet engine. It will be understood, however, that the principles of the invention are applicable to fuel controls of various types, for various kinds of engines, responding to various parameters of engine operation.

Referring to the drawings.

Figure 1:
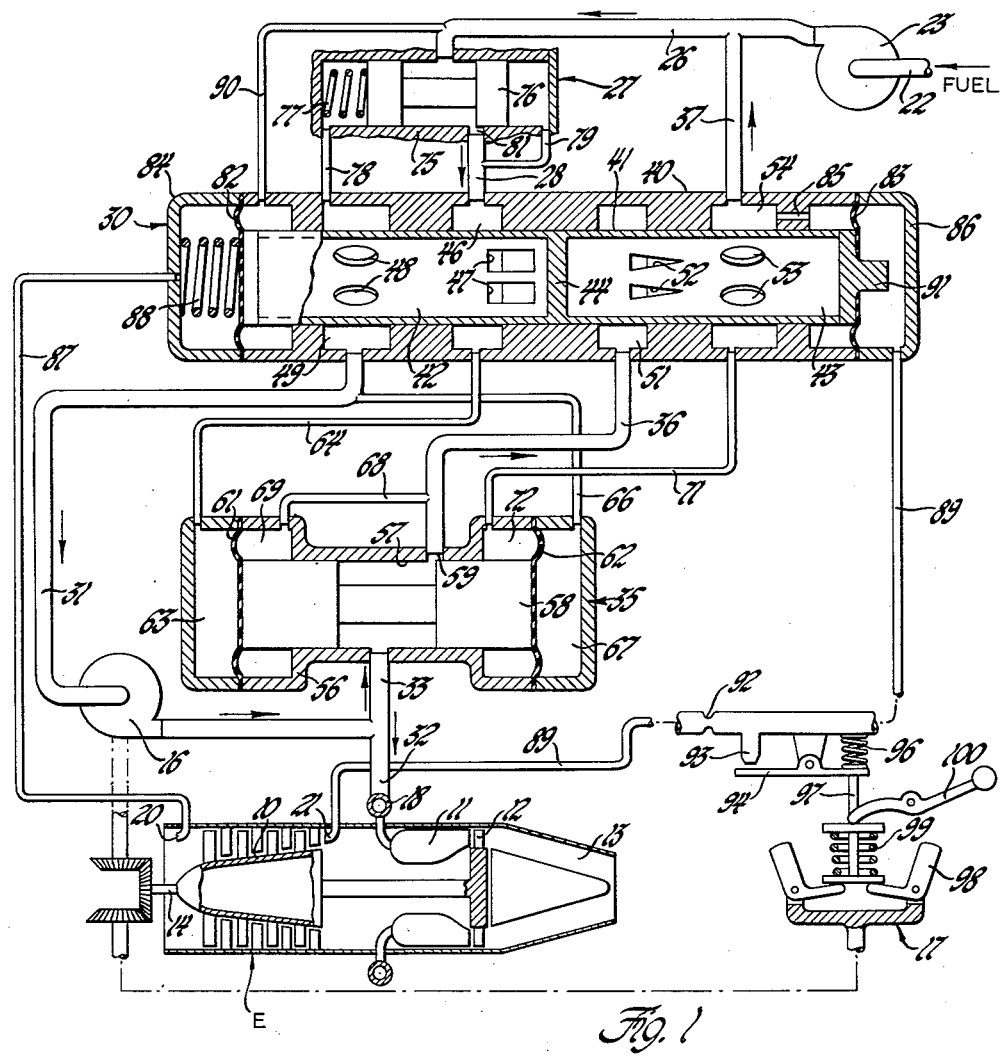
FIGURE 1 is a schematic diagram of a fuel system for a turbojet engine.

The exemplary jet engine E illustrated in FIGURE 1 comprises a compressor 10, combustion apparatus 11, a turbine 12 driving the compressor, and an exhaust duct 13. The turbine-compressor aggregate drives a power take-off or accessory drive shaft 14 which, in turn, drives various engine accessories including a main high pressure fuel pump 16 and a fuel controlling speed governor 17. Fuel is supplied to the combustion apparatus of the engine from a manifold 18. The supply of fuel to the engine is controlled by the governor 17 and by means responsive to pressure rise in the compressor 10 including a compressor inlet pressure probe 20 and a compressor discharge pressure probe 21. All of the devices previously referred to may be of known type, and the details are immaterial.

Fuel supplied to the engine may come from any suitable source through a line 22 and a boost or low pressure pump 23, which may be a centrifugal pump and may be driven by the engine. Pump 23 may be part of a pump aggregate with the high pressure pump 16. The low pressure pump 23, which will be referred to as a boost pump for conciseness, discharges through a line 26, a head regulating valve 27, a line 28, a main metering valve 30, line 31, high pressure pump 16, and a line 32 to the engine fuel manifold 18. The quantity of fuel delivered by pump 16 is greater than the maximum engine fuel requirements, this being due to the relation between the capacity of the pump and the characteristics of the engine. The excess of pumped fuel is returned through a bypass or return line 33, a head regulating or controlling valve 35, a line 36, metering valve 30, and line 37 to the boost pump discharge line 26.

The main metering valve 30 provides two sets of synchronously movable metering ports which control or meter, respectively, the flow to and from the main pump 16. The head regulating valve 27 maintains a constant pressure drop across the metering ports in the supply line to the main pump and the regulating valve 35 maintains a constant ratio between the pressure drops across the two sets of metering ports. The two regulating valves 27 and 35 therefore constitute means to maintain constant pressure drops across the metering ports in both the supply and return lines. The amount of fuel delivered to the engine through line 32 will, of course, be the difference between the amount of fuel supplied to the main pump and the amount returned from it. By metering both of these flows, the fuel flow to the engine is determined. The actual flow to the engine may be less than the return flow, so that it is not necessary as in the conventional system to attempt to meter directly this very small flow with the attendant difficulties. Also, it will be more clearly apparent from the subsequent detailed description that metering valve 30 acts only upon fuel at low pressure.

The main metering valve 30 comprises a body 40 having a central cylindrical bore within which is guided a movable valve member or sleeve 41 which is hollow and is closed by heads at both ends. The interior of the valve sleeve 41 is divided into two chambers 42 and 43 by a wall 44. Line 28 communicates through a recess 46 in the valve body and metering ports 47 with chamber 42 which, in turn, communicates through large constantly open ports 48 with a recess 49 to which main pump supply line 31 is connected. The effective area of ports 47 is therefore a function of the position of valve member 41. Main pump return line 36 is connected through a recess 51 and metering ports 52 to the other interior chamber 43 of sleeve 41, which discharges through large constantly open ports 53 and recess 54 in the valve body into line 37. Obviously, the effective area of ports 47 will vary with the position of valve sleeve 41 and likewise the effective area of ports 52. In order for the rates of flow of fuel through these two sets of ports to bear a constant relation at any particular position of the sleeve, the pressure drops across the two sets of ports must be maintained in constant ratio. Of course, the pressure drops can be equal, but this is not necessary.

The valve 35 provides a simple means to ensure that the pressure drops across the two sets of metering ports are maintained in constant ratio. Valve 35 comprises a body or housing 56 having a central cylinder 57 in which slides a valve spool 58. The return line 33 discharges into the cylinder 57 between the lands of valve spool 58. One of these lands throttles port 59 which controls the discharge through line 36. The enlarged ends of valve body 56 house two diaphragms 61 and 62 which are fixed to the ends of spool 58. Diaphragm 61 and the left face of spool 58, as illustrated, confront a chamber 63 to which the pressure in recess 46 upstream of metering ports 47 is communicated through passage 64. The diaphragm 62 and the right face of spool 58 are subjected to the pressure downstream of ports 47 communicated from line 31 through a passage 66 into chamber 67. Since the areas of the two chambers are the same, there is a net force urging spool 58 to the right proportional to the pressure drop through ports 47 and 48, the drop through ports 48 being negligible. A passage 68 extending from line 36 into a chamber 69 to the right of diaphragm 61 communicates the pressure upstream of metering ports 52. A passage 71 leads from recess 54 into chamber 72 to the left of diaphragm 62. The pressures in chambers 69 and 72 acting upon the diaphragms will bias valve spool 58 to the left with a force proportional to the pressure drop across ports 52 and 53, the latter being negligible. Any unbalance in the force acting upon the valve spool will move it to decrease or increase the area of port 59 to hold the pressure drop between recesses 51 and 54 in a fixed ratio to that between recesses 46 and 49. The value of this ratio will depend upon the relative areas of the diaphragms and the ends of the valve spool 58. If the spool is relatively small, the ratio may be near unity. By modifying and complicating to some extent the structure of the regulating valve 35, the two pressure drops may be held equal, if desired. There is no significant advantage to this however.

In order for the valve 30 to meter fuel in a definite quantity independent of the efficiency of the pumps, the valve 27 or some equivalent means is needed to maintain constant, or at least controlled, pressure drops across the metering ports. The valve 27 provides a simple and convenient arrangement for the purpose. This comprises a cylinder 75 within which a spool 76 reciprocates freely, biased by a compression spring 77. The spring-biased face of valve spool 76 is also biased by the pressure downstream of the metering ports 47 communicated from recess 49 through a passage 78. The other face of the valve is biased by the pressure upstream of the metering ports communicated from line 28 through a passage 79. Boost pump outlet line 26 enters the cylinder 75 between the two lands of spool 76 and line 28 is supplied from a port 81 controlled by one of the lands. This is a standard type of head regulating valve. It will be obvious that spool 76 moves to throttle port 81 sufficiently to maintain a constant drop across the metering ports 47. The boost pump 23 should supply fuel at a sufficient pressure to allow for small drops through valve 27 and through valve 30 and still provide sufficient pressure in line 31 to fuel pump 16.

It will be apparent from the foregoing that the flow through each of the two sets of metering ports of valve 30 is a definite prescribed function of the position of the valve sleeve 41. Therefore, to control fuel flow to the engine, it is necessary only to control the position of the valve sleeve. Any suitable means may be employed for this purpose including even such elementary means as direct manual control of the valve. However, for satisfactory operation of the gas turbine, somewhat more sophisticated control is highly desirable. Means of a known type are illustrated and will be explained briefly.

As shown, the metering valve 30 is controlled by compressor pressure rise to limit fuel flow during acceleration of the engine. A governor overrides or modulates the compressor pressure rise input to the valve to control fuel as a function of speed request compliance during steady-state running. Valve sleeve 41 is fixed to two diaphragms 82 and 83 fixed between the body 40 and end caps 84 and 86. These diaphragms are pressure-responsive and serve to seal against admixture of fuel and air. Compressor inlet pressure from probe 20 conducted through passage 87 is exerted against diaphragm 82 and the left face of the valve sleeve, which also is biased to the right by a compression spring 88. The diaphragm 83 and the right-hand face of sleeve 41 are subjected to compressor discharge pressure from probe 21 through a line 89. A boss 91 on the sleeve may limit motion to the right, in the port closing direction.

The inner faces of diaphragms 82 and 83 are subjected to boost pump discharge pressure as a convenient means to balance the pressures on these inner faces. Diaphragm 82 is connected through passage 90 to line 26 and diaphragm 83 through a drilled passage 85 to recess 54, which is at the same pressure. The axial position of valve sleeve 41 will be directly determined by the characteristic of spring 88 and the difference between compressor inlet and compressor discharge pressures, which may be referred to as compressor pressure rise, C.P.R. or $\Delta P$. The fuel flow to the engine, therefore, is determined by C.P.R., spring 88 and the contours of ports 47 and 52. The spring characteristic and the port contours are designed or selected in accordance with the ascertainable characteristics of the engine for which the control is designed.

To limit the speed of the engine for safety and to control the speed and thus determine the power of the engine, the governor 17 controls steady-state running. This may be accomplished very simply by providing a restriction 92 in C.D.P. line 89 and a branch bleed line 93 to atmosphere controlled by a pivoted valve member 94 normally closing the outlet of bleed 93. Valve 94 is normally held closed by spring 96, but may be opened by the plunger 97 actuated by flyweights 98 of the governor 17 driven by the engine. The speeder spring 99 of the governor may be adjustably set by a manual control lever 100. If, for example, the control is moved to call for increased speed, bleed 93 will close, full C.D.P. will be applied to valve 30, and fuel flow will increase. When the new governor speed setting is reached, the flyweights will open port 93 to bleed off air and create a pressure through restriction 92 so that the $\Delta P$ sense is reduced and fuel flow is reduced and held at whatever value causes the engine to operate at the set speed. On deceleration, the reduced speed setting of the governor will cause bleed 93 to open to reduce fuel and thereby reduce engine speed.

Figure 2:
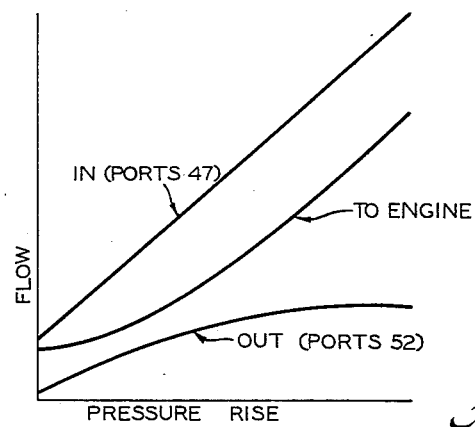
FIGURE 2 is a diagram illustrating the relation between compressor pressure rise and fuel flow.

The relation between fuel flow and compressor pressure rise will vary for different engines and must be determined for any particular engine to determine the contours of the metering ports. The general nature of the control is illustrated, however, by the curves of FIGURE 2 in which flow is plotted against compressor pressure rise. The flow into pump 16 through ports 47 may be approximately as indicated by the upper line in the chart, the flow out or return through ports 52 as indicated by the lower line. The flow to the engine is the difference between these and may follow approximately a quadratic relation. The flow in is a function of the capacity of high pressure pump 16 and the flow out is determined by the metering ports 52. The ports 47 act essentially to measure the flow to the main pump so that the flow to be subtracted from this may be determined.

Pump 16 may be any suitable pump having sufficient pressure rise and adaptable to variable delivery, such as a centrifugal or turbine type pump.

It may be noted that head regulating valve 27 may be downstream of the metering ports 47; that is, it may be in line 31 rather than between lines 26 and 28 as illustrated. In this case, the ports 47 and 53 will both be at boost pump pressure and, in any event, both sets of metering ports operate at near boost pump pressure, which is far below the usual main fuel pump discharge pressure.

The metering ports 47 and 52 are illustrated as being in sets of more than one and are referred to as sets for clarity in the appended claims. It is obvious that such a set may consist of only one port, and the claims are to be so understood.

The detailed description of preferred embodiments of the invention for the purpose of explaining the principles thereof is not to be considered as limiting or restricting the invention, since many modifications may be made within the scope thereof by the exercise of skill in the art.

I claim:

1. A system for supplying fuel comprising, in combination, a source of fuel under relatively low pressure, metering valve having two correlated sets of metering ports and means for simultaneously varying the areas of both said sets, a relatively high pressure pump with an inlet connected to the source through one set of said ports and an outlet connected to a delivery line and connected to the source through the other set of said ports, and head regulating means maintaining controlled constant pressure drops across both sets of said ports.

2. A system as recited in claim 1 in which the point of discharge of the second set of metering ports is substantially at source pressure.

3. A system as recited in claim 1 in which one of said head regulating means includes a throttling valve between the high pressure pump and the second set of metering ports.

4. A system as recited in claim 1 in which the head regulating means includes a throttling valve in series with each set of metering ports, one throttling valve being controlled by the pressure drop across one set of metering ports and the other throttling valve being controlled by the pressure drops across both sets of metering ports.

5. A system for supplying fuel comprising, in combination, a source of fuel under relatively low pressure, a metering valve having two correlated sets of metering ports and means for simultaneously varying the areas of both said sets, a relatively high pressure pump with an inlet connected to the source through one set of said ports and an outlet connected to a delivery line and connected to the source through the other set of said ports, head regulating means maintaining a controlled constant pressure drop across one set of said ports, and head regulating means maintaining a constant ratio of pressure drops across the two said sets of ports.

6. A system as recited in claim 5 in which the point of discharge of the second set of metering ports is substantially at source pressure.

7. A system as recited in claim 5 in which one of said head regulating means includes a throttling valve between the high pressure pump and the second set of metering ports.

8. A system as recited in claim 5 in which the head regulating means includes a throttling valve in series with each set of metering ports, one throttling valve being controlled by the pressure drop across one set of metering ports and the other throttling valve being controlled by the pressure drops across both sets of metering ports.

9. A system for supplying fuel comprising, in combination, a boost pump supplying fuel under relatively low pressure, a metering valve having two correlated sets of metering ports and means for simultaneously varying the areas of both said sets, a relatively high pressure pump with an inlet connected to the boost pump through one set of said ports and an outlet connected to a delivery line and connected to the boost pump through the other set of said ports, head regulating means maintaining a controlled constant pressure drop across one set of said ports, and head regulating means maintaining a constant ratio of pressure drops across the two said sets of ports.

10. A system as recited in claim 9 in which the point of discharge of the second set of metering ports is substantially boost pump outlet pressure.

11. A system as recited in claim 9 in which one of said head regulating means includes a throttling valve between the high pressure pump and the second set of metering ports.

12. A system as recited in claim 9 in which the head regulating means includes a throttling valve in series with each set of metering ports, one throttling valve being controlled by the pressure drop across one set of metering ports and the other throttling valve being controlled by the pressure drops across both sets of metering ports.

References Cited in the file of this patent

UNITED STATES PATENTS

| | | |
|---|---|---|
| 2,433,220 | Huber | Dec. 23, 1947 |
| 2,575,923 | McMahan et al. | Nov. 20, 1951 |
| 2,720,256 | Pearson | Oct. 11, 1955 |
| 2,730,167 | Sarto | Jan. 10, 1956 |
| 2,740,469 | Colestock | Apr. 3, 1956 |
| 2,971,339 | Gold et al. | Feb. 14, 1961 |